US011527899B2

(12) United States Patent
Lohe et al.

(10) Patent No.: US 11,527,899 B2
(45) Date of Patent: Dec. 13, 2022

(54) SYSTEMS AND METHODS FOR A BATTERY MANAGEMENT SYSTEM INTEGRATED IN A BATTERY PACK CONFIGURED FOR USE IN ELECTRIC AIRCRAFT (71) Applicant: BETA AIR, LLC, South Burlington, VT (US)

(72) Inventors: Braedon Andrew Lohe, Essex Junction, VT (US); Cullen Forrest Jemison, Winooski, VT (US); Andrew Joseph Giroux, Georgia, VT (US); Tom Michael Hughes, Bristol, VT (US)

(73) Assignee: BETA AIR, LLC, South Burlington, VT (US)

( * ) Notice: Subject to any disclaimer, the term of this patent is extended or adjusted under 35 U.S.C. 154(b) by 84 days.

(21) Appl. No.: 17/108,798

(22) Filed: Dec. 1, 2020

(65) Prior Publication Data
US 2022/0173601 A1 Jun. 2, 2022

(51) Int. Cl.
*H01M 10/46* (2006.01)
*H02J 7/00* (2006.01)
*H01M 10/42* (2006.01)

(52) U.S. Cl.
CPC ....... *H02J 7/0047* (2013.01); *H01M 10/4257* (2013.01); *H02J 7/0013* (2013.01);
(Continued)

(58) Field of Classification Search
CPC .... H02J 7/0047; H02J 7/0013; H02J 7/00032; H01M 10/4257; H01M 2010/4271; H01M 2220/20
(Continued)

(56) References Cited

U.S. PATENT DOCUMENTS 9,297,858 B2 3/2016 Lim
2010/0121587 A1 5/2010 Vian et al.
(Continued)

FOREIGN PATENT DOCUMENTS

CN 209600311 U 11/2019
CN 111204222 A 5/2020

OTHER PUBLICATIONS https://www.mdpi.com/2076-3417/8/4/534/pdf; Battery Management System Hardware Concepts: An Overview; By: Markus Lelie; Date: 2018.
(Continued)

*Primary Examiner* — Edward Tso
(74) *Attorney, Agent, or Firm* — Caldwell Intellectual Property Law (57) ABSTRACT

A battery management system integrated in a battery pack configured for use in electric aircraft, the system comprising a first battery management component disposed on a first end of the battery pack, the first battery management component comprising a first sensor suite configured to measure a first plurality of battery pack data wherein the first sensor suite comprises a moisture sensor. The battery management system comprising a second battery management component disposed on a second end of the battery pack, the second battery management component comprising a second sensor suite configured to measure a second plurality of battery pack data wherein the second sensor suite comprises a moisture sensor. The battery management system comprising a data storage system configured to store the first plurality of battery pack data and the second plurality of battery pack data.

20 Claims, 7 Drawing Sheets

(52) U.S. Cl.
CPC . *H02J 7/00032* (2020.01); *H01M 2010/4271* (2013.01); *H01M 2220/20* (2013.01)

(58) Field of Classification Search
USPC ....... 320/107, 114, 116, 118, 132, 149, 134; 702/63, 64; 340/636.1, 636.17, 636.18, 340/636.19, 636.2
See application file for complete search history.

(56) References Cited

U.S. PATENT DOCUMENTS

| | | | |
|---|---|---|---|
| 2011/0254502 A1* | 10/2011 | Yount | B60L 58/22 |
| | | | 320/118 |
| 2017/0126036 A1* | 5/2017 | Dulle | H01M 10/4207 |
| 2017/0179462 A1 | 6/2017 | Bourns et al. | |
| 2017/0199249 A1 | 7/2017 | Novak et al. | |
| 2019/0033395 A1 | 1/2019 | Karner et al. | |
| 2020/0028219 A1 | 1/2020 | Lee | |
| 2020/0036198 A1* | 1/2020 | Kim | H02J 7/0047 |
| 2020/0044461 A1 | 2/2020 | Winters | |
| 2020/0055407 A1 | 2/2020 | Foley | |
| 2020/0235441 A1 | 7/2020 | Rahimian | |
| 2020/0298728 A1 | 9/2020 | Demont | |
| 2021/0119465 A1* | 4/2021 | Choi | H02J 7/00712 |
| 2021/0391731 A1* | 12/2021 | Kirleis | B64D 27/24 |

OTHER PUBLICATIONS

International Search Report; Application No. PCT/US21/61126; dated Mar. 22, 2022; By: Authorized Officer Kari Rodriquez.

* cited by examiner

SYSTEMS AND METHODS FOR A BATTERY MANAGEMENT SYSTEM INTEGRATED IN A BATTERY PACK CONFIGURED FOR USE IN ELECTRIC AIRCRAFT

FIELD OF THE INVENTION

The present invention generally relates to the field of electric aircraft. In particular, the present invention is directed to systems and methods for a battery management system integrated in a battery pack configured for use in electric aircraft.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of high energy density power solutions. This is particularly problematic as it compounds the already daunting challenges to designers and manufacturers developing the aircraft for manned and/or unmanned flight in the real world. A power source needs to pack the maximum amount of energy in the lightest possible configuration. The future of electric aircraft and specifically, eVTOL aircraft, is linked to an increase in energy density in electric power sources.

SUMMARY OF THE DISCLOSURE

In an aspect a battery management system integrated in a battery pack configured for use in electric aircraft, the system comprising a first battery management component disposed on a first end of the battery pack, the first battery management component comprising a first sensor suite configured to measure a first plurality of battery pack data wherein the first sensor suite comprises a moisture sensor. The battery management system comprising a second battery management component disposed on a second end of the battery pack, the second battery management component comprising a second sensor suite configured to measure a second plurality of battery pack data wherein the second sensor suite comprises a moisture sensor. The battery management system comprising a data storage system configured to store the first plurality of battery pack data and the second plurality of battery pack data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 6 Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
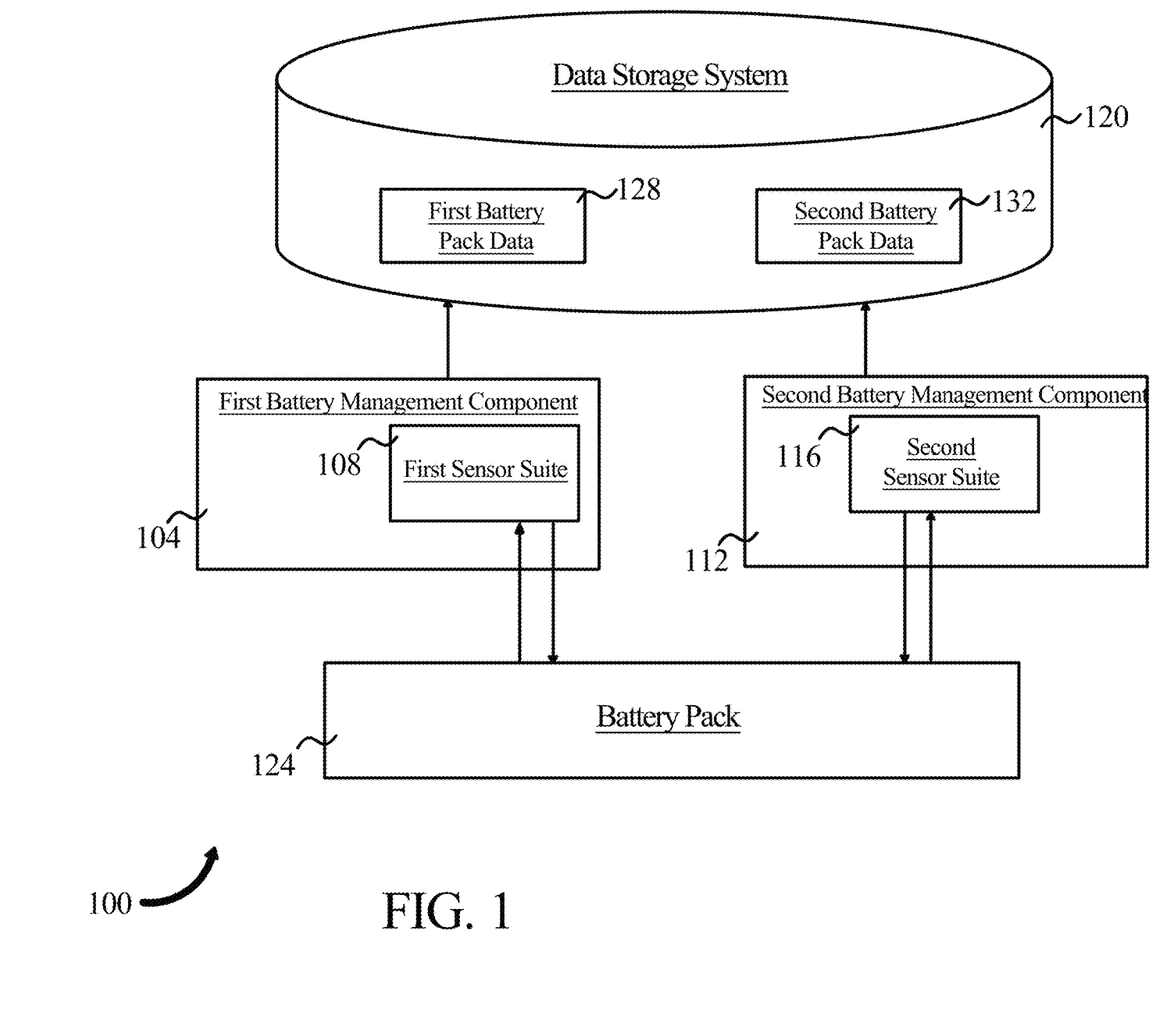
FIG. 1 is a block diagram of an embodiment of battery management system.

Referring now to FIG. 1, an embodiment of battery management system 100 is presented. Battery management system 100 is be integrated in a battery pack configured for use in an electric aircraft. The battery management system 100 is be integrated in a portion of the battery pack or subassembly thereof, which will be disclosed with further detail with reference to FIG. 3. Battery management system 100 includes first battery management component 104 disposed on a first end of the battery pack. One of ordinary skill in the art will appreciate that there are various areas in and on a battery pack and/or subassemblies thereof that may include first battery management component 104. First battery management component 104 may take any suitable form. In a non-limiting embodiment, first battery management component 104 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 104 may be soldered or otherwise electrically connected to a circuit board. First battery management component may be disposed directly over, adjacent to, facing, and/or near a battery module and specifically at least a portion of a battery cell, the arrangement of which will be disclosed with greater detail in reference to FIG. 3. First battery management component 104 includes first sensor suite 108. First sensor suite 108 is configured to measure, detect, sense, and transmit first plurality of battery pack data 128 to data storage system 120, which will be disclosed in further detail with reference to FIG. 5.

Referring again to FIG. 1, battery management system 100 includes second battery management component 112. Second battery management component 112 is disposed in or on a second end of battery pack 124. Second battery management component 112 includes second sensor suite 116. Second sensor suite 116 may be consistent with the description of any sensor suite disclosed herein. Second sensor suite 116 is configured to measure second plurality of battery pack data 132. Second plurality of battery pack data 132 may be consistent with the description of any battery pack data disclosed herein. Second plurality of battery pack data 132 may additionally or alternatively include data not measured or recorded in another section of battery management system 100. Second plurality of battery pack data 132 may be communicated to additional or alternate systems to which it is communicatively coupled. Second sensor suite 116 includes a moisture sensor consistent with any moisture sensor disclosed herein, namely moisture sensor 204.

With continued reference to FIG. 1, first battery management component 104 disposed in or on battery pack 124 may be physically isolated from second battery management component 112 also disposed on or in battery pack 124. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 104 and second battery management component 108 may perform the same or different functions in battery management system 100. In a non-limiting embodiment, the first and second battery management components perform the same, and therefore redundant functions. If, for example, first battery management component 104 malfunctions, in whole or in part, second battery management component 108 may still be operating properly and therefore battery management system 100 may still operate and function properly for electric aircraft in which it is installed. Additionally or alternatively, second battery management component 108 may power on while first battery management component 104 is malfunctioning. One of ordinary skill in the art would understand that the terms "first" and "second" do not refer to either "battery management components" as primary or secondary. In non-limiting embodiments, first battery management component 104 and second battery management component 108 may be powered on and operate through the same ground operations of an electric aircraft and through the same flight envelope of an electric aircraft. This does not preclude one battery management component, first battery management component 104, from taking over for second battery management component 108 if it were to malfunction. In non-limiting embodiments, the first and second battery management components, due to their physical isolation, may be configured to withstand malfunctions or failures in the other system and survive and operate. Provisions may be made to shield first battery management component 104 from second battery management component 108 other than physical location such as structures and circuit fuses. In non-limiting embodiments, first battery management component 104, second battery management component 108, or subcomponents thereof may be disposed on an internal component or set of components within battery pack 124, such as on battery module sense board 220.

Referring again to FIG. 1, first battery management component 104 may be electrically isolated from second battery management component 108. "Electrical isolation", for the purposes of this disclosure, refer to a first system's separation of components carrying electrical signals or electrical energy from a second system's components. First battery management component 104 may suffer an electrical catastrophe, rendering it inoperable, and due to electrical isolation, second battery management component 108 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 1, battery management system 100 includes data storage system 120. Data storage system 120 is configured to store first plurality of battery pack data 128 and second plurality of battery pack data 132. Data storage system 120 may include a database. Data storage system 120 may include a solid-state memory or tape hard drive. Data storage system 120 may be communicatively coupled to first battery management component 104 and second battery management component 112 and may be configured to receive electrical signals related to physical or electrical phenomenon measured and store those electrical signals as first battery pack data 128 and second battery pack data 132, respectively. Alternatively, data storage system 120 may include more than one discrete data storage systems that are physically and electrically isolated from each other. In this non-limiting embodiment, each of first battery management component 104 and second battery management component 112 may store first battery pack data 128 and second battery pack data 132 separately. One of ordinary skill in the art would understand the virtually limitless arrangements of data stores with which battery management system 100 could employ to store the first and second plurality of battery pack data.

Referring again to FIG. 1, data storage system 120 stores first plurality of battery pack data 128 and second plurality of battery pack data 132. First plurality of battery pack data 128 and second plurality of battery pack data 132 may include total flight hours that battery pack 124 and/or electric aircraft have been operating. The first and second plurality of battery pack data may include total energy flowed through battery pack 124. Data storage system 120 may be communicatively coupled to sensors that detect, measure and store energy in a plurality of measurements which may include current, voltage, resistance, impedance, coulombs, watts, temperature, or a combination thereof. Additionally or alternatively, data storage system 120 may be communicatively coupled to a sensor suite consistent with this disclosure to measure physical and/or electrical characteristics. Data storage system 120 may be configured to store first battery pack data 128 and second battery pack data 132 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 120 may store the first and second battery pack data that includes an upper voltage threshold and lower voltage threshold consistent with this disclosure. First battery pack data 128 and second battery pack data 132 may include a moisture level threshold. The moisture level threshold may include an absolute, relative, and/or specific moisture level threshold. Battery management system 100 may be designed to the Federal Aviation Administration (FAA)'s Design Assurance Level A (DAL-A), using redundant DAL-B subsystems.

Figure 2:
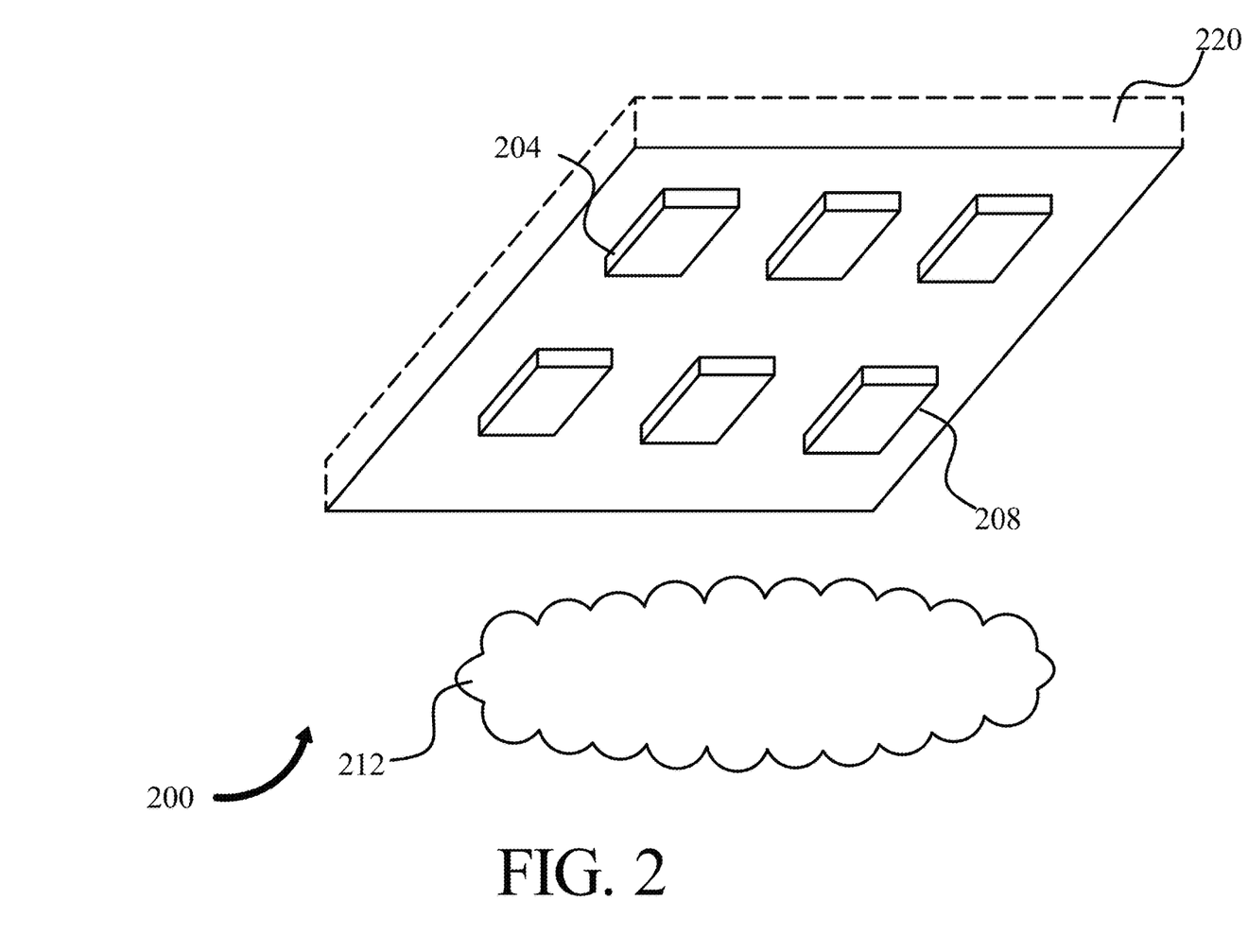
FIG. 2 is an illustration of a sensor suite in partial cut-off view.

Referring now to FIG. 2, an embodiment of sensor suite 200 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 124 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 100 and/or user to detect phenomenon is maintained and in a non-limiting example, a user alter aircraft usage pursuant to sensor readings.

Sensor suite 200 may be suitable for use as first sensor suite 104 and/or second sensor suite 116 as disclosed with reference to FIG. 1 hereinabove. Sensor suite 200 includes a moisture sensor 204. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor suite 200 may include electrical sensors 208. Electrical sensors 208 may be configured to measure voltage across a component, electrical current through a component, and resistance of a component. Electrical sensors 208 may include separate sensors to measure each of the previously disclosed electrical characteristics such as voltmeter, ammeter, and ohmmeter, respectively.

Alternatively or additionally, and with continued reference to FIG. 2, sensor suite 200 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell is high based on a detected voltage level of that battery cell or portion of the battery pack. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 200 may include digital sensors, analog sensors, or a combination thereof. Sensor suite 200 may include digital-to-analog converters (DAC), analog-to-digital converters (ADC, A/D, A-to-D), a combination thereof, or other signal conditioning components used in transmission of a first plurality of battery pack data 128 to a destination over wireless or wired connection.

With continued reference to FIG. 2, sensor suite 200 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 200, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 2, sensor suite 200 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure 212 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. The gas sensor that may be present in sensor suite 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 200 may include sensors that are configured to detect non-gaseous byproducts of cell failure 212 including, in non-limiting examples, liquid chemical leaks including aqueous alkaline solution, ionomer, molten phosphoric acid, liquid electrolytes with redox shuttle and ionomer, and salt water, among others. Sensor suite 200 may include sensors that are configured to detect non-gaseous byproducts of cell failure 212 including, in non-limiting examples, electrical anomalies as detected by any of the previous disclosed sensors or components.

With continued reference to FIG. 2, sensor suite 200 may be configured to detect events where voltage nears an upper voltage threshold or lower voltage threshold. The upper voltage threshold may be stored in data storage system 120 for comparison with an instant measurement taken by any combination of sensors present within sensor suite 200. The upper voltage threshold may be calculated and calibrated based on factors relating to battery cell health, maintenance history, location within battery pack, designed application, and type, among others. Sensor suite 200 may measure voltage at an instant, over a period of time, or periodically. Sensor suite 200 may be configured to operate at any of these detection modes, switch between modes, or simultaneous measure in more than one mode. First battery management component 104 may detect through sensor suite 200 events where voltage nears the lower voltage threshold. The lower voltage threshold may indicate power loss to or from an individual battery cell or portion of the battery pack. First battery management component 104 may detect through sensor suite 200 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 3:
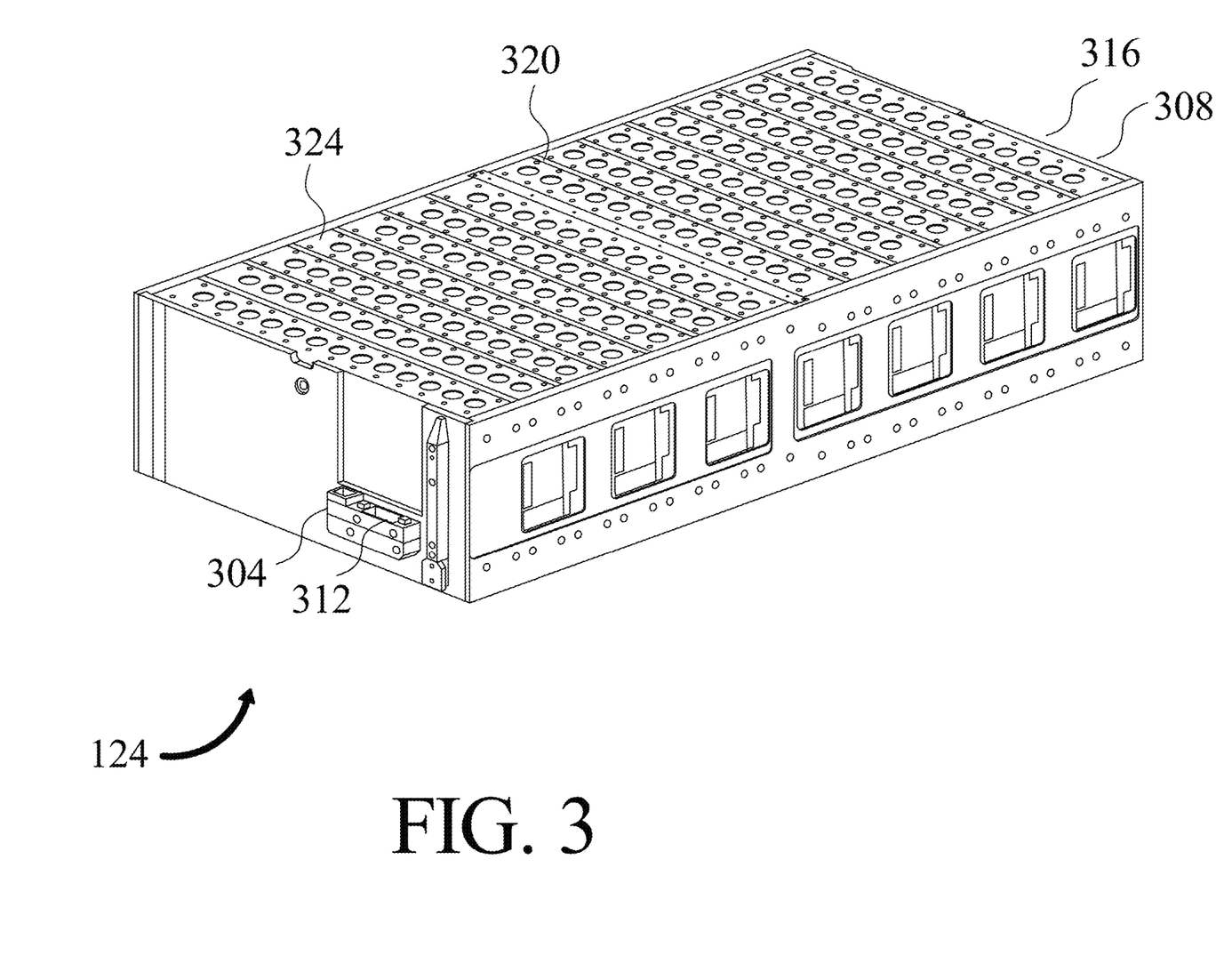
FIG. 3 is an illustration of a battery pack configured for use in an electric aircraft in isometric view.

With reference to FIG. 3, an exemplary embodiment of an eVTOL aircraft battery pack is illustrated. Battery pack 124 is a power source that may be configured to store electrical energy in the form of a plurality of battery modules, which themselves include of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 124 include 196 battery cells in series and 18 battery cells in parallel. This is, as someone of ordinary skill in the art would appreciate, is only an example and battery pack 124 may be configured to have a near limitless arrangement of battery cell configurations.

With continued reference to FIG. 3, battery pack 124 may include a plurality of battery modules. The battery modules may be wired together in series and in parallel. Battery pack 124 may include a center sheet which may include a thin barrier. The barrier may include a fuse connecting battery modules on either side of the center sheet. The fuse may be disposed in or on the center sheet and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof.

Battery pack 124 may also include a side wall includes a laminate of a plurality of layers configured to thermally insulate the plurality of battery modules from external components of battery pack 124. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack 124 and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

With continued reference to FIG. 3, battery pack 124 may also include an end panel including a plurality of electrical connectors and further configured to fix battery pack 124 in alignment with at least the side wall. The end panel may include a plurality of electrical connectors of a first gender configured to electrically and mechanically couple to electrical connectors of a second gender. The end panel may be configured to convey electrical energy from battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIG. 3, sensor suite 200 may be disposed in or on a portion of battery pack 124 near battery modules or battery cells. First sensor suite 104 may be disposed in or on a first portion of battery pack 124 and second sensor suite 116 may be disposed in or on a second portion of battery pack 124. Battery pack 124 includes battery management system head unit 304 disposed on a first end of battery pack 124. Battery management system head unit 304 is configured to communicate with a flight controller using a controller area network (CAN). Controller area network includes bus 312. Bus 312 may include an electrical bus. "Bus", for the purposes of this disclosure and in electrical parlance is any common connection to which any number of loads, which may be connected in parallel, and share a relatively similar voltage may be electrically coupled. Bus may refer to power busses, audio busses, video busses, computing address busses, and/or data busses. Bus 312 may be responsible for conveying electrical energy stored in battery pack 124 to at least a portion of an electric aircraft. Bus 312 may be additionally or alternatively responsible for conveying electrical signals generated by any number of components within battery pack 124 to any destination on or offboard an electric aircraft. Battery management system head unit 304 may comprise wiring or conductive surfaces only in portions required to electrically couple bus 312 to electrical power or necessary circuits to convey that power or signals to their destinations.

Outputs from sensors or any other component present within system may be analog or digital. Onboard or remotely located processors can convert those output signals from sensor suite to a usable form by the destination of those signals. The usable form of output signals from sensors, through processor may be either digital, analog, a combination thereof or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

With continued reference to FIG. 3, battery pack 124 includes second high voltage interface 308 disposed on a second end of battery pack 124. Second high voltage interface 308 may be configured to communicate with a flight controller by utilizing a controller area network (CAN). Second high voltage interface 3 includes second bus 316. Second bus 316 may include power busses, audio busses, video busses, computing address busses, and/or data busses. Bus 312 may be responsible for conveying electrical energy stored in battery pack 124 to at least a portion of an electric aircraft. Bus 312 may be additionally or alternatively responsible for conveying electrical signals generated by any number of components within battery pack 124 to any destination on or offboard an electric aircraft. Second high voltage interface 308 may comprise wiring or conductive surfaces only in portions required to electrically couple bus 312 to electrical power or necessary circuits to convey that power or signals to their destinations.

Figure 6:
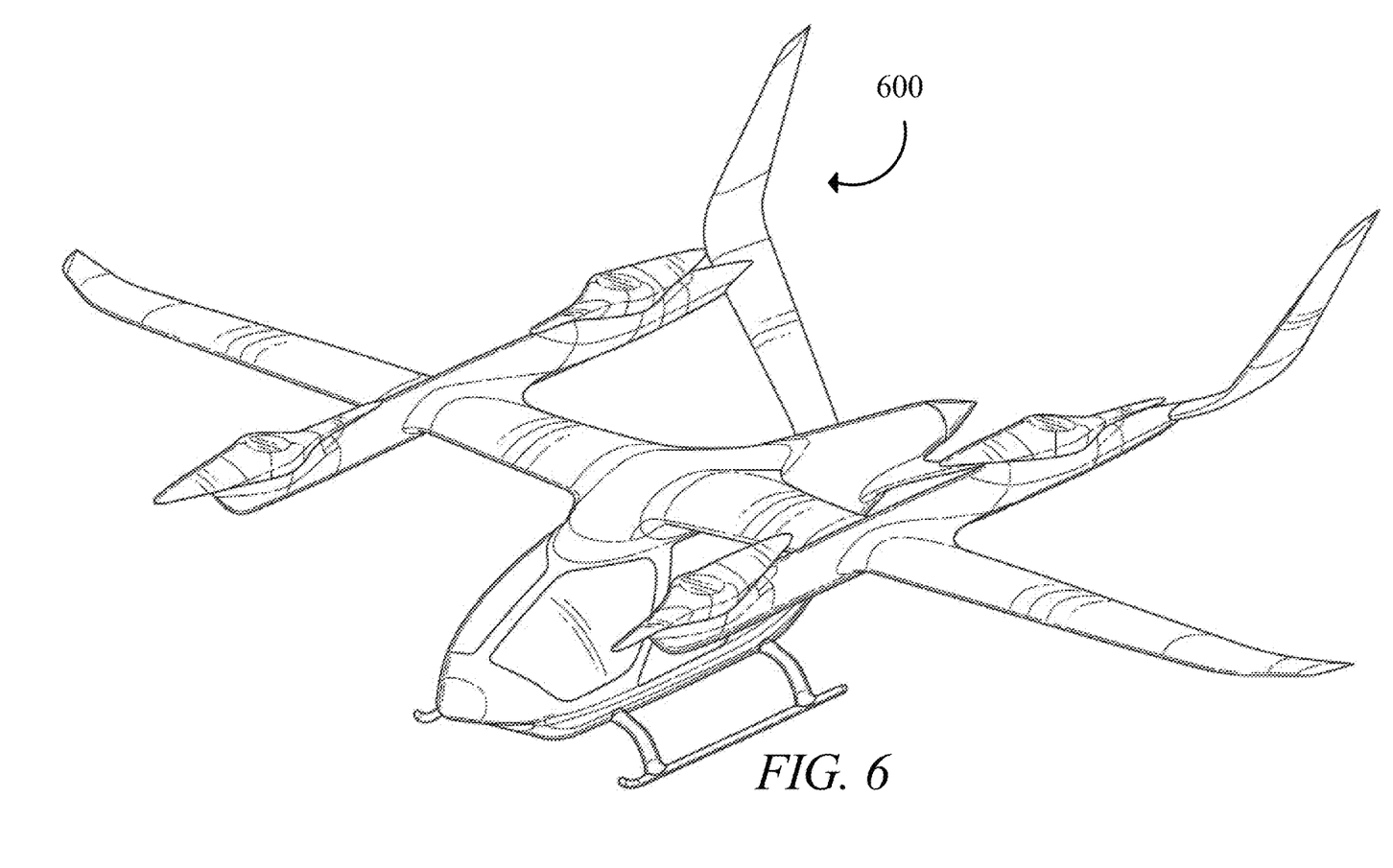
FIG. 6 is an illustration of an embodiment of an electric aircraft.

With continued reference to FIG. 3, any of the disclosed components or systems, namely battery pack 124, battery module sense board 220, and/or battery cells may incorporate provisions to dissipate heat energy present due to electrical resistance in integral circuit. Battery pack 124 includes one or more battery element modules wired in series and/or parallel. The presence of a voltage difference and associated amperage inevitably will increase heat energy present in and around battery pack 124 as a whole. The presence of heat energy in a power system is potentially dangerous by introducing energy possibly sufficient to damage mechanical, electrical, and/or other systems present in at least a portion of exemplary aircraft 600. Battery pack 124 may include mechanical design elements, one of ordinary skill in the art, may thermodynamically dissipate heat energy away from battery pack 124. The mechanical design may include, but is not limited to, slots, fins, heat sinks, perforations, a combination thereof, or another undisclosed element.

Heat dissipation may include material selection beneficial to move heat energy in a suitable manner for operation of battery pack 124. Certain materials with specific atomic structures and therefore specific elemental or alloyed properties and characteristics may be selected in construction of battery pack 124 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 124 may include similar or identical features and materials ascribed to battery pack 124 in order to manage the heat energy produced by these systems and components.

According to embodiments, the circuitry disposed within or on battery pack 124 may be shielded from electromagnetic interference. The battery elements and associated circuitry may be shielded by material such as mylar, aluminum, copper a combination thereof, or another suitable material. The battery pack 124 and associated circuitry may include one or more of the aforementioned materials in their inherent construction or additionally added after manufacture for the express purpose of shielding a vulnerable component. The battery pack 124 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies.

Referring again to FIG. 3, battery module sense board 220 may include a first opposite and opposing flat surface and may be configured to cover a portion of battery module within battery pack and face directly to at least an end of electrochemical battery cells. Battery module sense board 220 may be consistent with the sense board disclosed in U.S. patent application Ser. No. 16/948,140 entitled, "System and Method for High Energy Density Battery Module" and incorporated herein by reference in its entirety. First battery management component 104 may, in embodiments be disposed on a first side of battery module sense board 220 and second battery management component 112 may be disposed on a second side of battery module sense board 220. Alternatively, first battery management component 104 may be disposed on a first end of battery module sense board 220 and second battery management component 108 may be disposed on a second end of battery module sense board 220.

Figure 4:
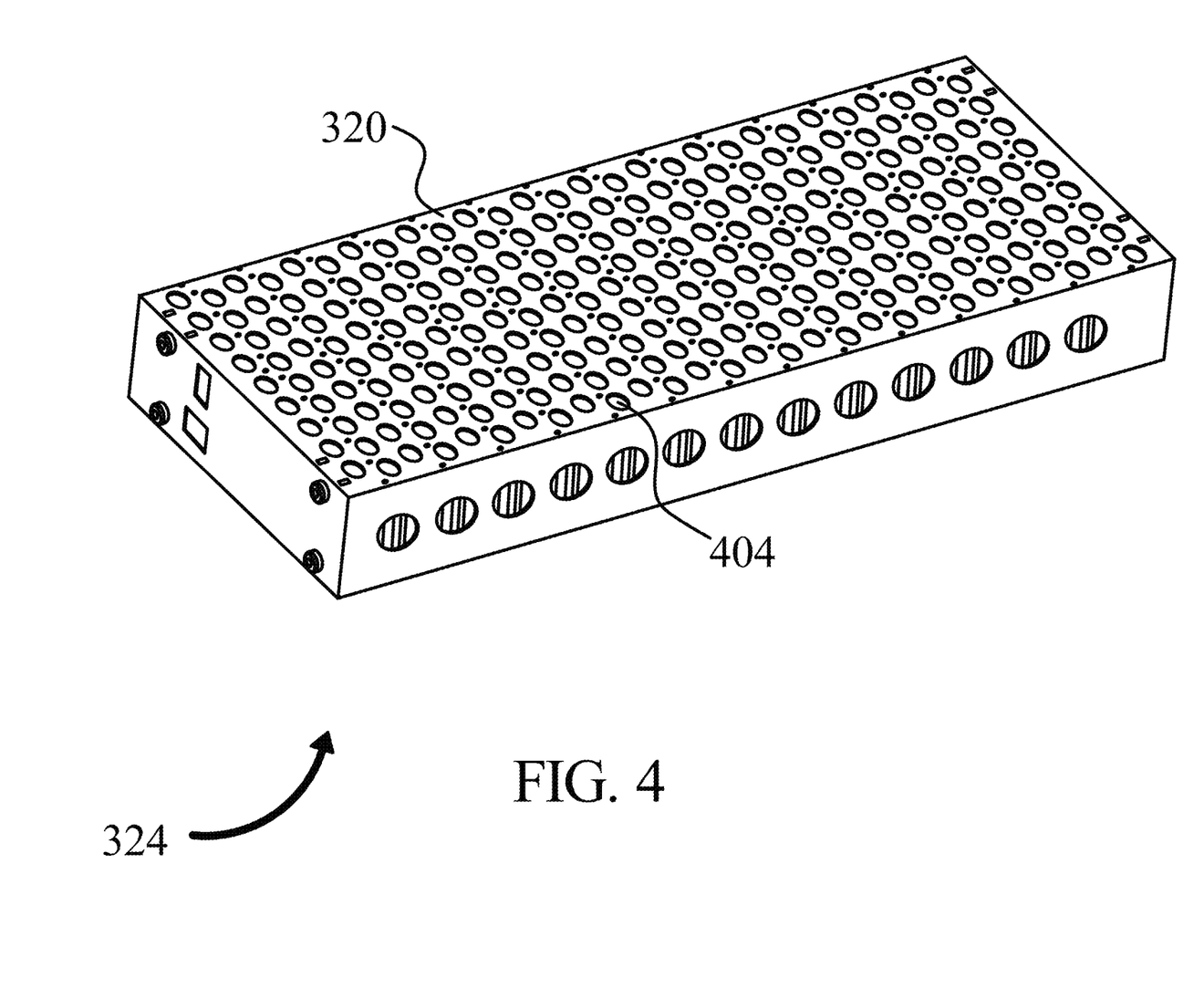
FIG. 4 is an illustration of a battery module and battery module sense board in isometric view.

With reference to FIG. 4, battery module 324 is presented including battery module sense board 220 shown opening aligned with the battery cells 404. Battery module sense board 220 may monitor battery cells 404. Battery module sense board 220 may include a rectangular prism shape configured to be opposite and oppose a back plate with openings correlating to battery cells 404. Battery module sense board 220 may include one or more circuits and/or circuit elements, including without limitation a printed circuit board component, aligned with a first side of battery module 324 and the openings correlating to the battery cells 404. Battery module sense board 220 may include, without limitation, a control circuit configured to perform and/or direct any actions performed by battery module sense board 220 and/or any other component and/or element described in this disclosure; control circuit may include any analog or digital control circuit, including without limitation a combinational and/or synchronous logic circuit, a processor, microprocessor, microcontroller, or the like.

Still referring to FIG. 4, battery module sense board 220 may include sensors or sensor suite 200 configured to measure physical and/or electrical parameters, such as without limitation temperature and/or voltage, of one or more battery cells. Battery module sense board 220 and/or a control circuit incorporated therein and/or communicatively connected thereto, may further be configured to detect failure within each battery cell 404, for instance and without limitation as a function of and/or using detected physical and/or electrical parameters. Cell failure may be characterized by a spike in temperature and battery module sense board 220 may be configured to detect that increase and generate signals, to notify users, support personnel, safety personnel, maintainers, operators, emergency personnel, aircraft computers, or a combination thereof and stored in data storage system 120.

Figure 5:
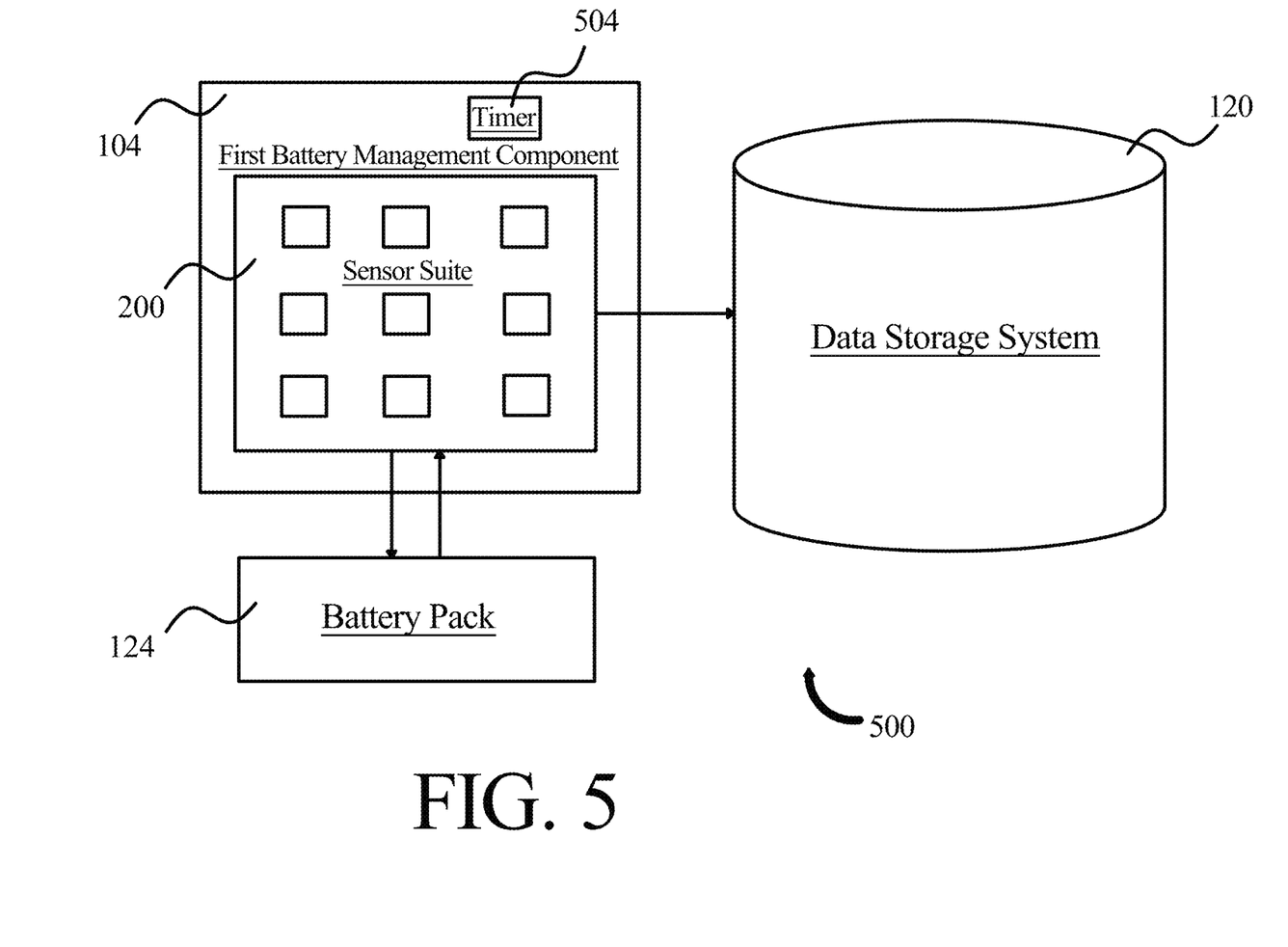
FIG. 5 is a block diagram illustrating a data collection system.

Referring now to FIG. 5, a block diagram of data collection system 500 is presented. Data collection system 500 includes sensor suite 200, which may be used for first sensor suite 108 in first battery management component 104 or second sensor suite 116 in second battery management component 112 or consistent with any sensor suite disclosed hereinabove. Data collection system 500 includes data storage system 120. Sensor suite 200 is configured to measure physical and/or electrical phenomena and characteristics of battery pack 124, in whole or in part. Sensor suite 200 then transmits electrical signals to data storage system 120 to be saved. Those electrical signals are representative of first battery pack data 128 and second battery pack data 132. The electrical signals communicated from sensor suite 200, and more moreover from the first or second battery management component to which it belongs may be transformed or conditioned consistent with any signal conditioning present in this disclosure. Data collection system 500 and more specifically first battery management component 104, may be configured to save first battery pack data 128 and second battery pack data 132 periodically in regular intervals to data storage system 120. "Regular intervals", for the purposes of this disclosure, refers to an event taking place repeatedly after a certain amount of elapsed time. Data collection system 500 may include first battery management component 104, which may include timer 504. Timer 504 may include a timing circuit, internal clock, or other circuit, component, or part configured to keep track of elapsed time and/or time of day. For example, in non-limiting embodiments, data storage system 120 may save the first and second battery pack data every 30 seconds, every minute, every 30 minutes, or another time period according to timer 504. Additionally or alternatively, data storage system 120 may save the first and second battery pack data after certain events occur, for example, in non-limiting embodiments, each power cycle, landing of the electric aircraft, when battery pack is charging or discharging, or scheduled maintenance periods. In non-limiting embodiments, battery pack 124 phenomena may be continuously measured and stored at an intermediary storage location, and then permanently saved by data storage system 120 at a later time, like at a regular interval or after an event has taken place as disclosed hereinabove. Additionally or alternatively, data storage system may be configured to save first battery pack data 128 and second battery pack data 132 at a predetermined time. "Predetermined time", for the purposes of this disclosure, refers to an internal clock within battery management system 100 commanding data storage system 120 to save the first and second battery pack data at that time. For example, data storage system 120 may be configured to save the first and second battery pack data at 0600 hours, 11 P.M. EDT, or another time or multiple times a day.

Referring now to FIG. 6, an embodiment of an electric aircraft 600 is presented. Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of an electric aircraft 600, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
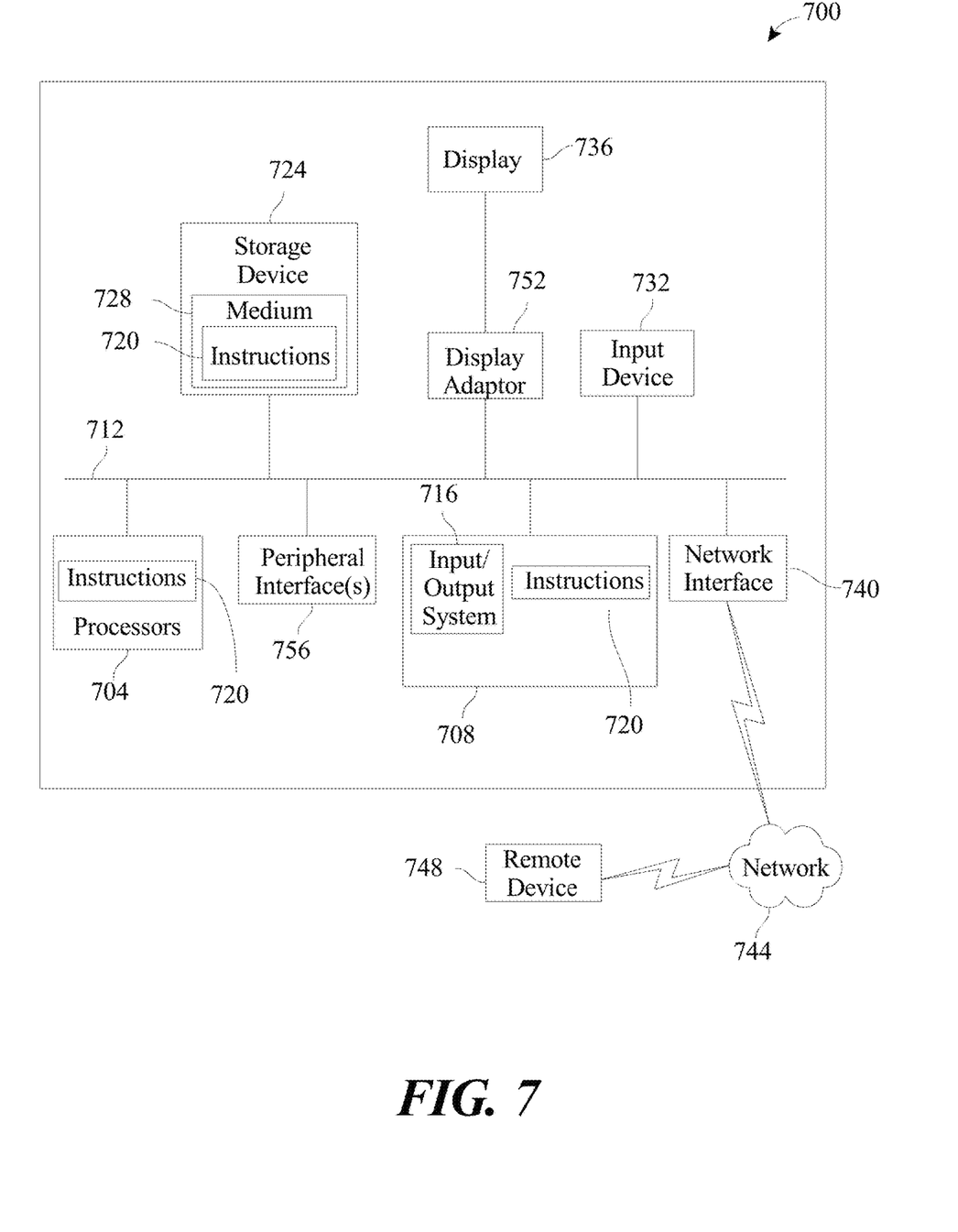
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system, such as the integrated motor 700 system of FIG. 7, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 794 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system. 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery management system integrated in a battery pack configured for use in electric aircraft, the system comprising:

a first battery management component disposed on a first end of the battery pack, the first battery management component comprising:
  a first sensor suite configured to measure a first plurality of battery pack data, wherein the first sensor suite comprises a humidity sensor; and
a second battery management component disposed on a second end of the battery pack, the second battery management component comprising:
  a second sensor suite configured to measure a second plurality of battery pack data, wherein the second sensor suite comprises a humidity sensor; and
a data storage system configured to store the first plurality of battery pack data and the second plurality of battery pack data.

2. The system of claim 1, wherein the data storage system is configured to save battery pack data periodically in regular intervals.

3. The system of claim 1, wherein the data storage system is configured to save battery pack data at a predetermined time.

4. The system of claim 1, wherein the first battery management component is physically isolated from the second battery management component.

5. The system of claim 1, wherein the first battery management component is electrically isolated from the second battery management component.

6. The system of claim 1, wherein the data storage system includes a database.

7. The system of claim 1, wherein at least a portion of the battery pack data includes total flight hours.

8. The system of claim 1, wherein at least a portion of the battery pack data includes total energy flowed through the battery pack.

9. The system of claim 1, wherein at least a portion of the battery pack data includes battery pack maintenance history.

10. The system of claim 1, wherein at least a portion of the battery pack data includes an upper voltage threshold.

11. The system of claim 1, wherein at least a portion of the battery pack data includes a lower voltage threshold.

12. The system of claim 1, wherein at least a portion of the battery pack data includes a moisture level threshold.

13. The system of claim 1, wherein the sensor suite includes a multimeter.

14. The system of claim 1, wherein the battery management system detects events where voltage nears the upper or lower voltage threshold.

15. The system of claim 1, wherein the battery management system detects events where voltage exceeds the upper or lower voltage threshold.

16. The system of claim 1, wherein the battery management system detects byproducts of catastrophic cell failure.

17. The system of claim 1, wherein the battery pack further comprises a high voltage front end configured to communicate with a flight controller using a controller area network.

18. The system of claim 17, wherein the controller area network comprises a bus for transmitting information.

19. The system of claim 1, wherein the high voltage front end is disposed on the first end of the battery pack.

20. The system of claim 1, wherein the high voltage front end is disposed on the second end of the battery pack.

* * * * *